(12) United States Patent
Rosenberger et al.

(10) Patent No.: US 12,240,778 B2
(45) Date of Patent: Mar. 4, 2025

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Ralph Sattmann, Hanau (DE); Achim Hofmann, Hanau (DE); Michael Hünermann, Hanau (DE); Kay Schuster, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 259 days.

(21) Appl. No.: 17/617,487

(22) PCT Filed: Jul. 15, 2020

(86) PCT No.: PCT/EP2020/069977
§ 371 (c)(1),
(2) Date: Dec. 8, 2021

(87) PCT Pub. No.: WO2021/009211
PCT Pub. Date: Jan. 21, 2021

(65) Prior Publication Data
US 2022/0234936 A1     Jul. 28, 2022

(30) Foreign Application Priority Data
Jul. 17, 2019   (EP) .................................... 19186741

(51) Int. Cl.
*C03B 37/027*    (2006.01)
*C03B 37/012*    (2006.01)
*G02B 6/02*      (2006.01)

(52) U.S. Cl.
CPC .... *C03B 37/02781* (2013.01); *C03B 37/0122* (2013.01); *C03B 37/0124* (2013.01);
(Continued)

(58) Field of Classification Search
None
See application file for complete search history.

(56) References Cited

U.S. PATENT DOCUMENTS

2003/0172682 A1   9/2003  Sato et al.
2003/0230118 A1   12/2003 Dawes et al.
(Continued)

FOREIGN PATENT DOCUMENTS

DE   102004054392 A1   3/2006
DE   102005028219 B3   10/2006
(Continued)

OTHER PUBLICATIONS

International Search Report and Written Opinion mailed Sep. 14, 2020 by the European Patent Office in its capacity as International Searching Authority for counterpart international patent application No. PCT/EP2020/069977 (with English translations attached).
(Continued)

*Primary Examiner* — Chris H Chu
(74) *Attorney, Agent, or Firm* — Panitch Schwarze Belisario & Nadel LLP (57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner bore and a cladding tube longitudinal axis along which a cladding tube wall extends that is delimited by an interior and an exterior; providing a number of tubular anti-resonant
(Continued)

element preforms; arranging the anti-resonant element preforms at target positions of the interior of the cladding tube wall, thereby forming a primary preform which has a hollow core region and an inner jacket region; and elongating the primary preform in order to form the hollow-core fiber or further processing the primary preform in order to form a secondary preform. The aim of the invention is to achieve a high degree of precision and an exact positioning of the anti-resonant elements in a sufficiently stable and reproducible manner on the basis of the aforementioned methods. This is achieved in that the step of providing and/or arranging the anti-resonant element preforms and/or the process of carrying out a hot-forming process includes a fixation measure and/or a sealing measure using an amorphous $SiO_2$ particle-containing sealing or joining compound.

14 Claims, 2 Drawing Sheets

(52) U.S. Cl.
CPC ..... G02B 6/02328 (2013.01); G02B 6/02395 (2013.01); *C03B 2203/16* (2013.01); *C03B 2203/42* (2013.01)

(56) References Cited

U.S. PATENT DOCUMENTS

| | | | |
|---|---|---|---|
| 2004/0096173 | A1 | 5/2004 | Fekety et al. |
| 2005/0226578 | A1 | 10/2005 | Mangan et al. |
| 2006/0046075 | A1 | 3/2006 | Maul et al. |
| 2006/0130528 | A1 | 6/2006 | Nelson et al. |
| 2008/0310806 | A1 | 12/2008 | Mukasa |
| 2009/0019893 | A1 | 1/2009 | Bogdahn |
| 2020/0278491 | A1* | 9/2020 | Poletti ................ G02B 6/02328 |
| 2020/0317557 | A1* | 10/2020 | Gibson ................ C03B 37/0122 |
| 2021/0311250 | A1* | 10/2021 | Jasion ................ G02B 6/02328 |
| 2022/0196907 | A1* | 6/2022 | Poletti .................. C03B 23/076 |

FOREIGN PATENT DOCUMENTS

| | | | | |
|---|---|---|---|---|
| DE | 102014011041 | A1 | 1/2016 | |
| EP | 3136143 | A1 | 3/2017 | |
| GB | 2566466 | A | 3/2019 | |
| JP | 60186426 | A * | 9/1985 | ....... C03B 37/01446 |
| JP | 05004833 | A * | 1/1993 | ....... C03B 37/01282 |
| WO | 02/072489 | A2 | 9/2002 | |
| WO | 2018/169487 | A1 | 9/2018 | |
| WO | 2019/008352 | A1 | 1/2019 | |

OTHER PUBLICATIONS

Jasion, Gregory T. et al., "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).

Kosolapov, A.F. et al., "Hollow-core revolver fibre with a double-capillary reflective cladding" Quantum Electronics 46 (3) Mar. 29, 2016 pp. 267-270 (DOI: 10.1070/QEL15972).

Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).

Poletti, Francesco "Nested antiresonant nodeless hollow core fiber," Optics Express, vol. 22, No. 20 (2014) pp. 23807-23828 (DOI:10.1364/OE 22.023807).

Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).

Yu, Fei, "Chapter 4—Fabrication of hollow core negative curvature fibre" IN "Hollow core negative curvature fibres" University of Bath PhD. pp. 59-74, Dec. 31, 2013 (XP055656461).

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a plurality of anti-resonance elements, comprising the method steps of:
- (a) providing a number of anti-resonance element preforms,
- (b) arranging the anti-resonance element preforms at setpoint positions of the inner side of the cladding tube wall to form a primary preform for the hollow core fiber, which comprises a hollow core region and a sheath region, and
- (c) elongating the primary preform to form the hollow-core fiber or further processing the primary preform into a secondary preform from which the hollow-core fiber is drawn, wherein the further processing comprises a single or repeated performance of one or more of the following hot-forming processes:
  - (i) elongation,
  - (ii) collapse,
  - (iii) collapse and simultaneous elongation,
  - (iv) collapse of additional sheath material,
  - (v) collapse of additional sheath material and subsequent elongation,
  - (vi) collapse of additional sheath material and simultaneous elongation.

The invention also relates to a method for producing a preform for an anti-resonant hollow-core fiber or for producing a semi-finished product from which an anti-resonant hollow-core fiber is obtained by means of elongation, which comprises a hollow core extending along a longitudinal axis of the fiber and the inner sheath region surrounding the hollow core, which sheath region comprises a plurality of anti-resonance elements, comprising the method steps of:
- (a) providing a cladding tube comprising an inner bore of the cladding tube and a longitudinal axis of the cladding tube along which a cladding tube wall delimited by an inner side and an outer side extends,
- (b) providing a number of anti-resonance element preforms, and
- (c) arranging the anti-resonance element preforms in each case at a setpoint position of the inner side of the cladding tube wall to form a primary preform for the hollow core fiber, which comprises a hollow core region and a sheath region, and
- (d) optionally further processing the primary preform into a secondary preform for the hollow-core fiber, wherein the further processing comprises a single or repeated performance of one or more of the following hot-forming processes:
  - (i) elongation,
  - (ii) collapse,
  - (iii) collapse and simultaneous elongation,
  - (iv) collapse of additional sheath material,
  - (v) collapse of additional sheath material and subsequent elongation,
  - (vi) collapse of additional sheath material and simultaneous elongation.

Conventional single-mode optical fibers made of solid material have a core region made of glass, which is surrounded by a sheath region made of glass with a lower refractive index. Light guidance is based thereby on total reflection between the core and the cladding region. However, the interactions of the guided light with the solid material are associated with an increased latency in data transmission and relatively low damage thresholds with respect to high-energy radiation.

These disadvantages are prevented or reduced by "hollow core fibers" in which the core comprises an evacuated cavity filled with gas or liquid. In hollow-core fibers, the interaction of the light with the glass is less than in solid core fibers. The refractive index of the core is less than that of the sheath so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission.

Potential applications of the hollow core fibers lie in the fields of data transmission, high-power beam guidance, for example for material processing, modal filtering, non-linear optics, in particular for super-continuum generation, from the ultraviolet to infrared wavelength range.

Prior Art

A disadvantage of anti-resonant hollow-core fibers is that higher-order modes are not necessarily suppressed so that they are often not exclusively single-mode over long transmission lengths and the quality of the output beam deteriorates.

In the paper by Francesco Poletti "Nested anti-resonant nodeless hollow core fiber," Optics Express, vol. 22, no. 20 (2014), DOI: 10.1364/OE 22.023807, a fiber design is proposed in which anti-resonance elements are not designed as a simple singular structural element but are composed of several nested structural elements. The nested anti-resonance elements are designed such that higher-order core modes are phase-matched to the sheath modes and are suppressed, but not the fundamental core mode. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), in which the core can conduct further modes in addition to the fundamental mode. For this purpose, it is surrounded by an inner sheath having "non-resonant elements" which provide a phase-matching of anti-resonant modes with the higher modes. The hollow-core fiber is produced according to what is known as a "stack-and-draw technique" by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers, with which a first sheath region comprises a plurality of rods and a second sheath region comprises a plurality of tubes surrounded by a cladding tube. Rods, tubes, and cladding tube are joined to form a preform by means of the "stack and draw" technique. Before the preform is elongated, the preform end is sealed which is done by applying a sealing compound. For example, a UV adhesive is used as the sealing compound.

Technical Object

Anti-resonant hollow core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber drawing process.

In the known "stack and draw" technique, many elements are to be joined together with positional accuracy. For example, in order to produce the hollow-core fiber known from the aforementioned paper in the "NANF" design, six anti-resonance element preforms, each consisting of an anti-resonance element outer tube (ARE outer tube, for short) and an anti-resonance element inner tube welded on one side to the inner sheath surface of the ARE outer tube (ARE inner tube, for short) must be attached to the inner side of a cladding tube.

In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The aim of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the method for producing the anti-resonant hollow core fiber, this object is achieved according to the invention starting from a method of the aforementioned genus according to the invention in that providing and/or arranging the anti-resonance element preforms and/or carrying out a process according to method step (d) comprises a fixing measure and/or a sealing measure using a sealing or bonding compound containing amorphous $SiO_2$ particles.

The starting point for producing the anti-resonant hollow-core fiber is a preform, also referred to herein as a "primary preform." It comprises a cladding tube in which or on which precursors or preforms for the shaping of anti-resonance elements are contained in the hollow-core fibers (referred to here as "anti-resonance elements" for short). The primary preform may be elongated to form the hollow-core fiber; however, as a rule, the primary preform is further processed to produce therefrom a preform referred to herein as a "secondary preform." Optionally, the hollow-core fiber is produced by elongating the secondary preform. Alternatively, the primary preform or the secondary preform are surrounded by a collecting cylinder or a plurality of collecting cylinders to form a coaxial ensemble of components, and the coaxial ensemble is elongated directly to form the hollow-core fiber. The general term "preform" is understood here to mean that component or that coaxial ensemble of components from which the hollow-core fiber is ultimately drawn.

The sealing or bonding compound used in the method according to the invention for sealing or fixing contains amorphous $SiO_2$ particles, which are held, for example, in a dispersion liquid. This compound is applied between the surfaces to be bonded or sealed and is generally liquid or pasty during use. When dried at low temperature, the dispersion liquid is partially or completely removed and the compound solidified. The sealing or bonding compound, and, in particular, the solidified $SiO_2$-containing sealing or bonding compound obtained after drying, satisfies the requirements for fixing and compacting. The temperature required for drying is below 300° C., which facilitates compliance with the dimensional stability of the preform and avoids thermal impairments. Heating to higher temperatures around 800° C., for example during elongation of the preform to form the hollow-core fiber, results in further thermal solidification of the sealing or bonding compound, which is also suitable for forming opaque or transparent glass. This is done by sintering or vitrifying, wherein sintering to form opaque glass requires comparatively lower temperatures and/or short heating durations than vitrifying to complete transparency. The sealing or bonding compound can thus be completely compacted by heating and vitrified by heating in the hot-forming process. The sealing or bonding compound behaves like silica glass; it becomes viscous and deformable.

The sealing or bonding compound can thus be compressed by heating and is preferably vitrified by heating when carrying out a process according to method step (d).

In the elongation process, the sealing or bonding compound does not decompose and releases few impurities. It is thus characterized by thermal stability and purity in the elongation process and it avoids deformations, like those that can otherwise occur as a result of different coefficients of thermal expansion between a sealing or bonding compound made from a material containing $SiO_2$ particles.

The coefficient of thermal expansion of the sealing or bonding compound containing $SiO_2$ ideally corresponds to that of the surfaces to be bonded and/or sealed. By adding one or more doping agents, it can be changed and adapted. For example, $Al_2O_3$, $TiO_2$, $Y_2O_3$, AlN, $Si_3N_4$, $ZrO_2$, BN, $HfO_2$ or $Yb_2O_3$ may be considered doping agents.

With the invention, anti-resonant hollow core fibers and preforms for this purpose can be produced precisely and reproducibly.

In a preferred method, the anti-resonance element preforms are fixed to the inner side of the cladding tube using the sealing or bonding compound.

Fixing is carried out in a punctiform manner at one or more locations or extends over a greater length or over the entire length of the anti-resonance element preform.

The anti-resonance element preforms are generally cylindrical in shape and have two opposite end regions, wherein fixing is preferably carried out exclusively at one of the end regions or exclusively at both end regions using the sealing or bonding compound.

Impairment of the light guidance caused by the sealing or bonding compound is thus reduced and is prevented if the volumetric regions of the preform coated with sealing or bonding compound are subsequently removed or are not used to draw the hollow core fibers.

The sealing or bonding compound is applied in a punctiform manner or in strips, for example, to the setpoint positions of the anti-resonance element preforms on the inner side of the cladding tube, and the anti-resonance element preforms are pressed thereon and thus at least temporarily fixed. The application surface is preferably as small as possible, in order to minimize impairments to the light guidance. The application surface is preferably so small that it is not visible in a projection from the preform central axis onto the anti-resonance element preform; i.e., it is completely covered by the anti-resonance element preform.

However, a procedure with which a cladding tube having a circular inner cross-section is provided has also proven itself, wherein a longitudinal structure, preferably a longitudinal groove, is produced on the inner side of the cladding tube wall and has a recess to which or in which the anti-resonance element preforms are fixed.

The sealing or bonding compound is introduced into the recess of the longitudinal structure, so that the anti-resonance element preforms, when arranged at the respective setpoint position according to method step (c), contact the sealing or bonding compound.

The anti-resonance element preforms may simultaneously touch the longitudinal edges of the recess. In this case, the recess serves not only to accommodate the sealing or bonding compound, but also as a positioning aid for the anti-resonance element preform in that it makes it easier for the anti-resonance element preforms to assume predetermined defined positions on the inner side of the cladding tube.

The accuracy of the positioning of the preforms is improved by structuring the cladding tube beforehand by mechanical machining. Therefore, the longitudinal structure of the inner side of the cladding tube is preferably produced by means of drilling, sawing, milling, cutting or grinding.

In comparison to other known forming techniques, said machining techniques provide more precise and finer structures by using heat and pressure and avoid contamination of surfaces by molding tools, such as nozzles, presses or fusion molds.

In an advantageous procedure, the arranging of the anti-resonance element preforms on the inner side of the cladding tube comprises fixing by means of a positioning template to be introduced into the inner side of the cladding tube, which positioning template has multiple radially outward-facing holding elements for positioning the anti-resonance element preforms at the setpoint positions.

The structurally predetermined star-shaped arrangement of the holding elements facilitates the exact positioning of the anti-resonance element preforms at the respective setpoint positions and their fixing by means of the sealing or bonding compound. In this case, the positioning template is preferably used exclusively in the region of the cladding tube end faces, preferably in the region of both cladding tube end faces.

In a preferred method, with which the anti-resonance element preforms are composed of a plurality of nested structural elements, said nested structural elements are fixed with respect to one another using the sealing or bonding compound.

Here as well, the individual nested structural elements are fixed with respect to one another in a punctiform manner at one or more locations or the fixing extends over a greater length or over the entire length of the structural elements, for example over a longitudinal strip on the cylinder jacket surface of cylindrical structural elements. The fixing of cylindrical structural elements using the sealing or bonding compound preferably takes place only at one face end or only at both face ends of the structural elements.

In a further preferred method, the preform is bonded to a holder for carrying out a process according to method step (d), wherein the bond between preform and holder is produced by means of the sealing or bonding compound.

The holder serves to hold the preform having a horizontally or vertically oriented preform longitudinal axis in a device for carrying out a hot-forming process, for example on the feed device of an elongating or fiber-drawing device. It can engage on one end face or on both end faces of the preform and is preferably made of glass. Producing the bond between preform and holder by means of the sealing or bonding compound ensures that the components are prevented from fusing, as is otherwise customary, and, as a result, thermal deformations associated with the fusion bond are also avoided.

In a further preferred method, the preform is bonded to a gas connection for carrying out a process according to method step (d), wherein the bond between preform and gas connection is produced by means of the sealing or bonding compound.

The gas connection is preferably made of glass and serves to introduce a compressed gas or for evacuation. In this case, the approach predetermined in the prior art is a connection sealed by a plastic compound. Although this is very flexible, it lacks temperature stability. Leakages at high temperatures can lead to temperature fluctuations, in particular in the fiber drawing process. A connection that is both temperature stable and gas tight is produced by establishing the bond between the preform and the gas connection by means of the sealing or bonding compound.

The gas connection can bear against the preform as a whole, wherein the bond is made to the cylinder jacket surface or to the end face of the outermost tube or to the outermost material layer, and/or the gas connection can take place with individual components or constituents of the preform, for example to nested structural elements of the anti-resonance element preforms. Particularly when connecting to thin, filigree components, such as said structural elements, stresses can occur when ceramic adhesives, which can destroy the components, are used. In order to avoid such stresses, it is advantageous to dope the sealing or bonding compound containing $SiO_2$ in order to adapt the coefficient of thermal expansion to that of the component or preform constituent to be connected. For example, $Al_2O_3$, $TiO_2$, $Y_2O_3$, AlN, $Si_3N_4$, $ZrO_2$, BN, $HfO_2$ or $Yb_2O_3$ may be considered doping agents.

In a further preferred method, open ends of the anti-resonance element preforms and/or individual nested structural elements of the anti-resonance element preforms and/or any annular gap between tube elements are closed by means of the sealing or bonding compound to carry out a process according to method step (d).

The anti-resonance element preforms are composed of a single, non-nested structural element (for example, a glass tube) or of several smaller nested structural elements, with which the glass tube surrounds at least one tubular or planar component (nested elements). The sealing or bonding compound here serves to fluidically seal individual or all structural elements of the preform. Sealing is carried out by sealing the end-face openings of the relevant structural elements with the sealing or bonding compound. In the case of structural elements open on both sides, it may be sufficient for one of the front side openings to be closed by the sealing or bonding compound. As a result of the structural elements being closed, they escape the effect of pressurization or evacuation, which otherwise acts on the preform or on the unsealed structural elements. With nested structural elements, for example, the pressurization or evacuation of one of the plurality of smaller structural elements can be prevented in this way. This measure enables a positionally accurate, defined pressure control, in particular in the fiber-drawing process.

Particularly with regard to a low optical attenuation and a large optical transmission bandwidth of the hollow-core fiber, it has proven to be particularly advantageous for the anti-resonance elements to be arranged about the hollow core with an odd symmetry.

In a preferred method, the accuracy of the positioning of the preforms in the cladding tube is further improved in that tubular structural elements are provided, of which at least some have a wall thickness in the range of 0.2 and 2 mm, preferably a wall thickness in the range of 0.25 and 1 mm, and wherein a cladding tube is provided with an external diameter in the range of 90 and 250 mm, and preferably with an external diameter in the range of 120 to 200 mm. These components each have a length of at least 1 m. They are relatively high-volume structural elements for forming anti-resonance elements. This simplifies handling. In addition, with a vertical arrangement of cladding tube and structural elements, gravitational force supports the parallelity and vertical alignment of the longitudinal axes of the structural elements, if the structural elements are each positioned and fixed at their upper face end at the setpoint position; for example and preferably using the sealing or bonding compound explained in more detail above, and, additionally or alternatively thereto, by means of the positioning template explained in more detail above.

With regard to the production of the preform for the hollow core fiber, the aforementioned technical object is achieved according to the invention, starting from a method of the aforementioned genus according to the invention, in that providing and/or arranging the anti-resonance element preforms and/or performing a process according to method step (d) comprises a fixing measure and/or a sealing measure using a sealing or bonding compound containing amorphous $SiO_2$ particles.

The preform is a starting point for the production of the anti-resonant hollow-core fiber. By elongating the primary preform, either the anti-resonant hollow-core fiber is drawn directly, or a different semi-finished product is first produced by further processing of the primary preform, which semi-finished product is also referred to herein as the "secondary preform," and from which semi-finished product the anti-resonant hollow-core fiber can be drawn.

In any case, the production of the preform comprises the installation and the connecting of anti-resonance element preforms to a cladding tube. In the production of the preform, the provision and/or the arrangement of the anti-resonance element preforms involves a fixing measure using an amorphous sealing or bonding compound that contains $SiO_2$ particles and preferably forms glass during heating. Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls which, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material, or crystalline material.

Anti-Resonance Element Preform/Anti-Resonance Element Precursor

What are referred to as anti-resonance element preforms are components or constituents of the preform that essentially become anti-resonance elements in the hollow-core fiber by simple lengthening during the fiber-drawing process. Components or constituents of the preform that are first formed into anti-resonance element preforms or directly into anti-resonance elements by forming are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element may be a further tube which bears against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multiple nested anti-resonance element preforms, at least one further structural element, for example a third tube abutting against the inner sheath surface of the nested ARE inner tube, may be arranged in the inner bore of the nested ARE inner tube. Where there are multiple nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products in which the original anti-resonance element preforms are present in a shape that has been modified compared to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform may be present as an ensemble consisting of at least one cladding tube and preforms or precursors for anti-resonance elements that are loosely accommodated or firmly fixed therein. The further processing of the primary preform into a secondary preform from which the hollow-core fiber is drawn may comprise a single or repeated performance of one or more of the following hot-forming processes:
 (i) elongation,
 (ii) collapse,
 (iii) collapse and simultaneous elongation,
 (iv) collapse of additional sheath material,
 (v) collapse of additional sheath material and subsequent elongation,
 (vi) collapse of additional sheath material and simultaneous elongation.

A preform obtained by collapsing and/or elongating a primary preform is referred to in the literature as a cane. Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" which has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner sheath surface of the tube" and the designation "outer side of the tube" is also used as a synonym for "outer sheath surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling and grinding. This machining creates a longitudinal structure extending in the direction of the longitudinal axis of the cladding tube and serves as a positioning aid for the anti-resonance element preforms. The longitudinal structure is accessible from the inner side of the cladding tube; it may also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$ and $D_{90}$ values. In this case, the $D_{10}$ value characterizes the particle size that is not achieved by 10% of the cumulative volume of the $SiO_2$ particles, and accordingly, the $D_{50}$ value and the $D_{90}$ value characterize the particle sizes that are not achieved by 50% and by 90%, respectively, of the cumulative volume of the $SiO_2$ particles. The particle size distribution is determined by scattered light and laser diffraction spectroscopy according to ISO 13320.

Exemplary Embodiment

The invention is explained in more detail below with reference to an exemplary embodiment and a drawing.

The following are shown in detail in schematic representation and in a plan view of the cross-section.

In the method according to the invention for producing a hollow core fiber or for producing a preform for a hollow core fiber, a sealing or bonding compound based on $SiO_2$ is used for fixing components of the preform or for sealing hollow channels in the preform. The production of said compound is described, for example, in DE 10 2004 054 392 A1. Amorphous $SiO_2$ particles are obtained by wet milling grains of high-purity silica glass. An aqueous base slip is produced containing amorphous $SiO_2$ particles having a particle size distribution characterized by a $D_{50}$ value of about 5 μm and by a $D_{90}$ value of about 23 μm. Further amorphous $SiO_2$ grains with an average grain size of about 5 μm are mixed with the base slip. The slip used as a bonding compound has a solid content of approximately 90%, which consists of at least 99.9 wt. % $SiO_2$. Small proportions of doping agents may be present in order to adapt the thermal expansion coefficient.

The slip compound is applied to one or both of the contact surfaces to be bonded. It is also possible to form a slip compound between the contact surfaces fixed to one another beforehand. This is subsequently solidified by drying and heating. The amorphous $SiO_2$ particles used to form the slip consist of synthetically prepared $SiO_2$ or are prepared based on purified naturally occurring raw material.

Figure 1:
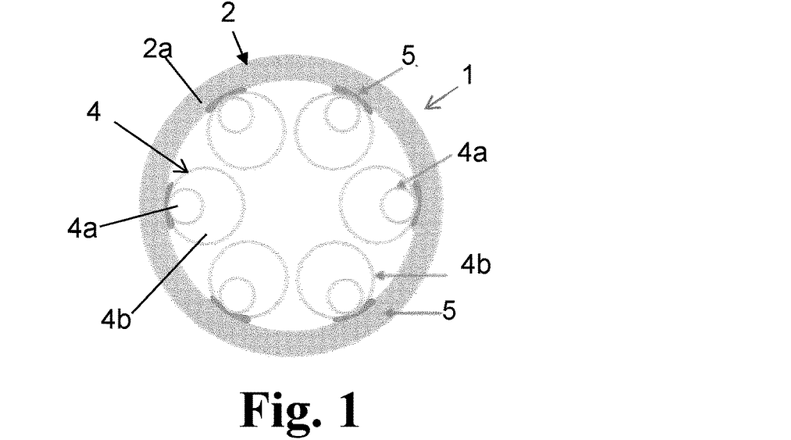
FIG. 1 a first embodiment of a primary preform having anti-resonance element preforms positioned therein and fixed using a sealing or bonding compound containing $SiO_2$ to produce a preform for a hollow core fiber, FIG. 2 a second embodiment of a primary preform having anti-resonance element preforms positioned therein and fixed using a sealing or bonding compound containing $SiO_2$ to produce a preform for a hollow core fiber, FIG. 3 an anti-resonance element preform in a magnified representation composed of a plurality of nested structural elements connected to one another using a sealing or bonding compound containing $SiO_2$, FIG. 4 a primary preform having anti-resonance element preforms positioned and fixed therein, a part of which is closed using a sealing or bonding compound containing $SiO_2$, FIG. 5 a primary preform having anti-resonance element preforms positioned and fixed therein, which are closed using a sealing or bonding compound containing $SiO_2$, and FIG. 6 a primary preform having a hollow core closed using a sealing or bonding compound containing $SiO_2$ and open anti-resonance element preforms positioned and fixed about the hollow core.

FIG. 1 schematically shows a primary preform 1 having a cladding tube 2 with a wall 2a, on the inner side of which are fixed anti-resonance element preforms 4 at a uniform distance at previously defined azimuthal positions; in the exemplary embodiment, there are six preforms 4.

The cladding tube 2 consists of silica glass and has a length of 500 mm, an external diameter of 30 mm and an internal diameter of 24 mm. The anti-resonance element preforms 4 are present as an ensemble of nested structural elements (4a; 4b) made from an ARE outer tube 4a and an ARE inner tube 4b. The ARE outer tube 4a has an external diameter of 7.4 mm and the ARE inner tube 4b has an external diameter of 3.0 mm. The wall thickness of both structural elements (4a; 4b) is the same and is 0.35 mm. The lengths of ARE outer tube 4a and ARE inner tube 4b correspond to the cladding tube length 1.

The anti-resonance element preforms 4 are fixed to the inner side of the wall of the cladding tube 2 by means of the bonding compound 5 based on $SiO_2$.

The bonding compound 5 is applied to the inner side of the cladding tube wall in strips, and the anti-resonance element preforms 4 are placed thereon using a positioning template having a structurally predetermined star-shaped arrangement of holding elements for the individual anti-resonance element preforms 4.

This method creates a precise and reproducible bond between the cladding tube 2 and the anti-resonance element preforms 4. Solidification of the bonding compound 5 at a low temperature below 300° C. is sufficient for fixing, so that strong heating of the surrounding regions, and thus a deformation of the anti-resonance element preforms 4, is avoided.

Figure 2:
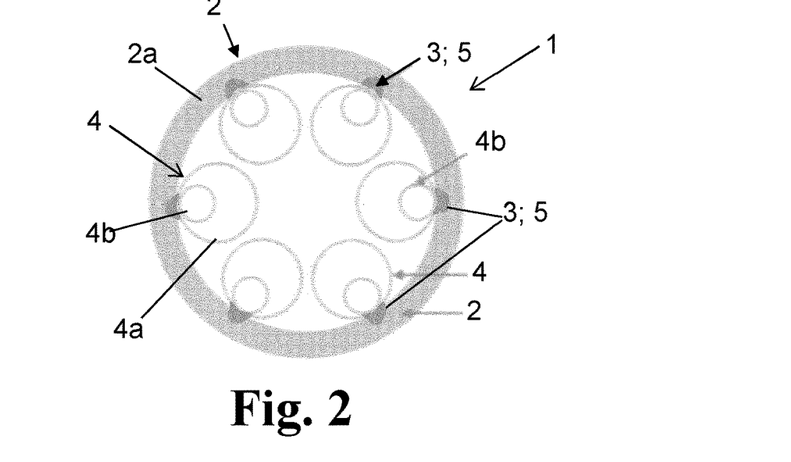

In the embodiment shown in FIG. 2, longitudinal grooves 3 are created beforehand in each case on the inner side of the wall 2a of the cladding tube 2 at the setpoint positions of the anti-resonance element preforms 4 by means of milling. The longitudinal grooves 3 are distributed evenly in hexagonal symmetry about the inner circumference of the cladding tube 2. The bonding compound 5 is introduced into the longitudinal axis grooves 3 in the region of the two face ends, and the anti-resonance element preforms 4 are pressed thereon so as to have two contact lines axially parallel to the longitudinal edges of the longitudinal grooves 3. This ensures an exact alignment of anti-resonance element preforms 4.

In order to realize the fixing between anti-resonance element preforms 4 and the longitudinal edges of the longitudinal grooves 3, a small clearance (a few μm) or contact is necessary. The anti-resonance element preforms 4 are therefore preferably pressed against the longitudinal grooves 3 during the bonding process by means of the aforementioned positioning template.

Figure 3:
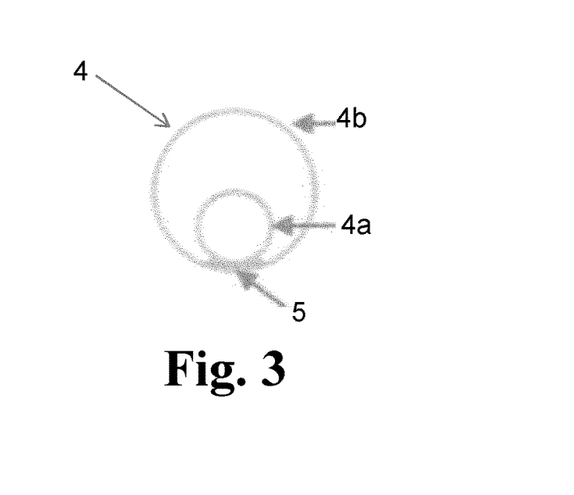

FIG. 3 schematically shows an embodiment of the anti-resonance element preform 4 in the form of an ensemble of nested structural elements (4a; 4b) consisting of an ARE outer tube 4a and an ARE inner tube 4b. The two structural elements (4a; 4b) are connected to one another by means of the bonding compound 5 based on $SiO_2$.

The primary preform 1 (which is the ensemble consisting of cladding tube 2 and structural elements (4a; 4b) inserted therein) is subsequently further processed to form a larger, secondary preform for the hollow core fiber. For this purpose, it is overlaid with a collecting cylinder made from silica glass and the coaxial ensemble consisting of primary preform and collecting cylinder is simultaneously elongated to form the secondary preform. In this collapse and elongation process, which takes place in the vertical orientation of the preform longitudinal axis, the upper ends of the primary preform and the collecting cylinder are bonded to a holder made of silica glass, wherein the bond between the preform and the holder is produced by means of the bonding compound described.

Figure 4:
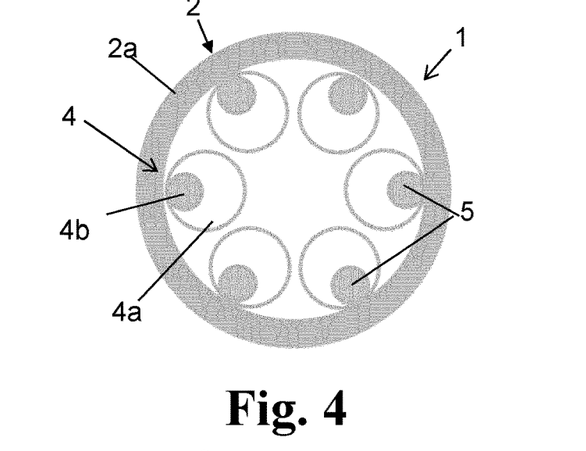

The secondary preform obtained according to the collapse and elongation process is also referred to in the English technical literature as "cane." It is drawn to form the hollow core fibers. For this purpose, the preform is additionally bonded to a gas connection made from silica glass, wherein the bond between the preform and the gas connection is also produced by means of the bonding compound. In order to prevent pressurization of the fine structural elements, such as the ARE inner tube 4b, their open ends are sealed beforehand by means of the $SiO_2$-based sealing and bonding compound 5, as shown schematically in FIG. 4. The sealing and bonding compound 5 can be seen as a gray-shaded area. It is sufficient for the sealing and bonding compound 5 to seal a short length of the inner bore of the ARE inner tube 4b, preferably at that end that corresponds to the upper end when carrying out a hot-forming process with a vertically oriented preform longitudinal axis.

Figure 5:
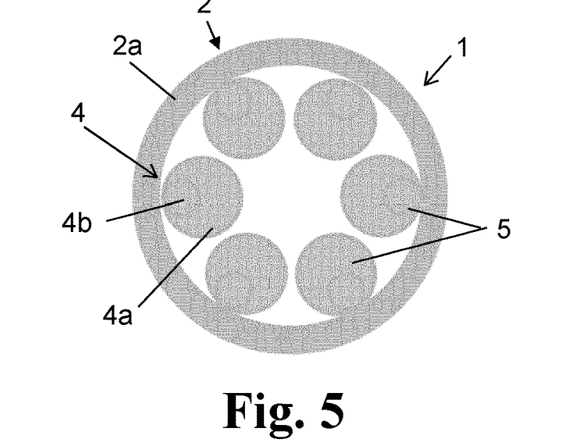

FIG. 5 shows an embodiment of the preform 1, wherein both structural elements (4a; 4b) of the anti-resonance element preforms 4 are closed with the sealing and bonding compound.

It is also possible to introduce a pressure supply line into the structural elements (4a and/or 4b) and to subsequently seal the remaining opening with the sealing compound containing $SiO_2$, so that no pressure can escape upward.

Figure 6:
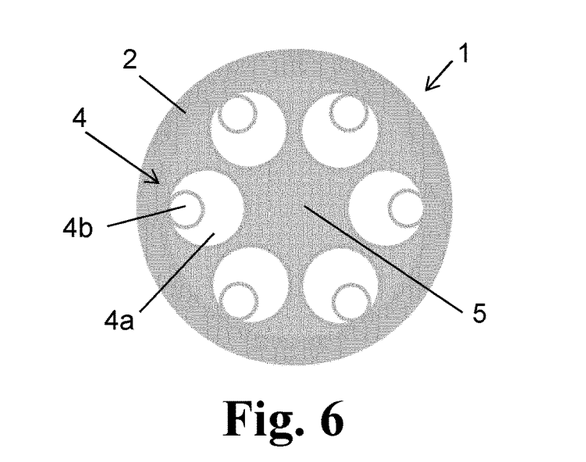

FIG. 6 shows an embodiment with which both structural elements (4a; 4b) of the anti-resonance element preforms 4 are open, but the remaining cross-section of the inner bore of the cladding tube is closed with the sealing and bonding compound 5.

The invention claimed is:

1. A method for producing an anti-resonant hollow-core fiber comprising a hollow core extending along a longitudinal axis of the fiber and a sheath region surrounding the hollow core and comprising a plurality of anti-resonance elements, the method comprising:
- (a) providing a cladding tube comprising an inner bore of the cladding tube and a longitudinal axis of the cladding tube, along which a cladding tube wall delimited by an inner side and an outer side extends,
- (b) providing a number of anti-resonance element preforms composed of a plurality of nested structural elements,
- (c) arranging the anti-resonance element preforms at setpoint positions of the inner side of the cladding tube wall to form a primary preform for the hollow-core fiber, which comprises a hollow core region and a sheath region, and
- (d) elongating the primary preform to form the hollow-core fiber or further processing the primary preform into a secondary preform from which the hollow-core fiber is drawn, wherein the further processing comprises a single or repeated performance of one or more of the following hot-forming processes:
  - (i) elongation,
  - (ii) collapse,
  - (iii) collapse and simultaneous elongation,
  - (iv) collapse of additional sheath material,
  - (v) collapse of additional sheath material and subsequent elongation,
  - (vi) collapse of additional sheath material and simultaneous elongation, wherein the provision of the anti-resonance element preforms comprises a fixing measure,
wherein the nested structural elements are fixed with respect to one another using a sealing or bonding compound containing amorphous $SiO_2$ particles obtained by wet milling grains of high-purity silica glass, and wherein the sealing or bonding compound is vitrified by heating during a hot forming process according to process step (d).

2. The method according to claim 1, wherein the anti-resonance element preforms are fixed to the inner side of the cladding tube using the sealing or bonding compound.

3. The method according to claim 2, wherein the anti-resonance element preforms are cylindrical and have two opposite end regions, and that fixing using the sealing or bonding compound takes place exclusively at one of the end regions or exclusively at both end regions.

4. The method according to claim 2, wherein the arranging of the anti-resonance element preforms on the inner side of the cladding tube comprises fixing by means of a positioning template to be introduced into the inner bore of the cladding tube, which positioning template has multiple radially outward-facing holding elements for positioning the anti-resonance element preforms at the setpoint positions.

5. The method according to claim 4, wherein the positioning template is used exclusively in the region of the cladding tube end faces, preferably in the region of both cladding tube end faces.

6. The method according to claim 1, wherein a cladding tube having a circular inner cross-section is provided, and in that a longitudinal structure, preferably a longitudinal groove, is produced on the inner side of the cladding tube wall and has a recess to which or in which the anti-resonance element preforms are fixed.

7. The method according to claim 6, wherein the sealing or bonding compound is introduced into the recess of the longitudinal structure and that the anti-resonance element preforms, when arranged at the setpoint position according to method step (c), contact the sealing or bonding compound.

8. The method according to claim 6, wherein the longitudinal structure of the inner side of the cladding tube is produced by means of drilling, sawing, milling, cutting or grinding.

9. The method according to claim 1, wherein the fixing of cylindrical structural elements using the sealing or bonding compound takes place only at one face end or only at both face ends of the structural elements.

10. The method according to claim 1, wherein, in order to carry out a process according to method step (d), the preform is bonded to a holder, and the bond between the preform and the holder is produced by means of the sealing or bonding compound.

11. The method according to claim 1, wherein, in order to carry out a process according to method step (d), the preform is bonded to a gas connection, and the bond between the preform and the gas connection is produced by means of the sealing or bonding compound.

12. The method according to claim 1, wherein open ends of the anti-resonance element preforms and/or individual structural elements of the anti-resonance element preforms and/or any annular gap between tube elements can be closed by means of the sealing or bonding compound to carry out a process according to method step (d).

13. The method according to claim 1, wherein the anti-resonance elements are arranged about the hollow core with an odd symmetry.

14. A method for producing a preform for an anti-resonant hollow-core fiber comprising a hollow core extending along a longitudinal axis of the fiber and a sheath region surrounding the hollow core, said sheath region comprising a plurality of anti-resonance elements, with the method comprising:
- (a) providing a cladding tube comprising an inner bore of the cladding tube and a longitudinal axis of the cladding tube, along which a cladding tube wall delimited by an inner side and an outer side extends,
- (b) providing a number of anti-resonance element preforms composed of a plurality of nested structural elements,
- (c) arranging the anti-resonance element preforms in each case at setpoint positions of the inner side of the cladding tube wall to form a primary preform for the hollow-core fiber, which comprises a hollow core region and a sheath region, and
- (d) optionally further processing the primary preform into a secondary preform for the hollow-core fiber, wherein the further processing comprises a single or repeated performance of one or more of the following hot-forming processes:
  - (i) elongation,
  - (ii) collapse,
  - (iii) collapse and simultaneous elongation,
  - (iv) collapse of additional sheath material,
  - (v) collapse of additional sheath material and subsequent elongation,
  - (vi) collapse of additional sheath material and simultaneous elongation, wherein the provision of the anti-resonance element preforms comprises a fixing measure,
wherein the nested structural elements are fixed with respect to one another using a sealing or bonding compound containing amorphous $SiO_2$ particles obtained by wet milling grains of high-purity silica glass, wherein the sealing or bonding compound is vitrified by heating during a hot forming process according to process step (d).

* * * * *